United States Patent Office 3,295,187
Patented Jan. 3, 1967

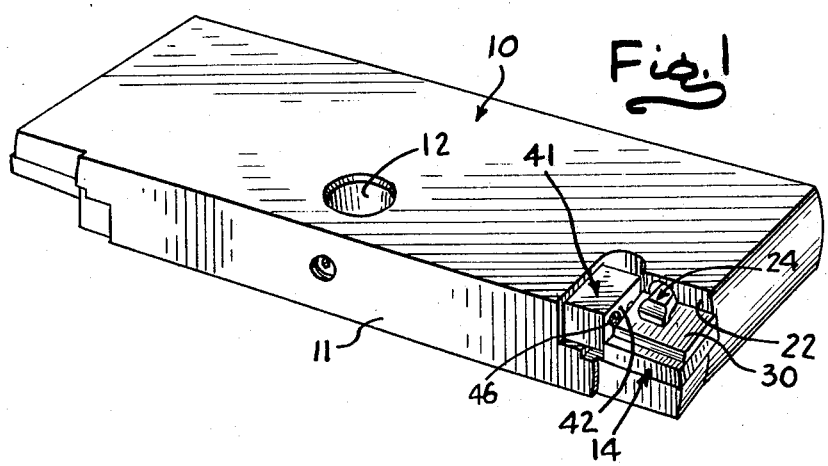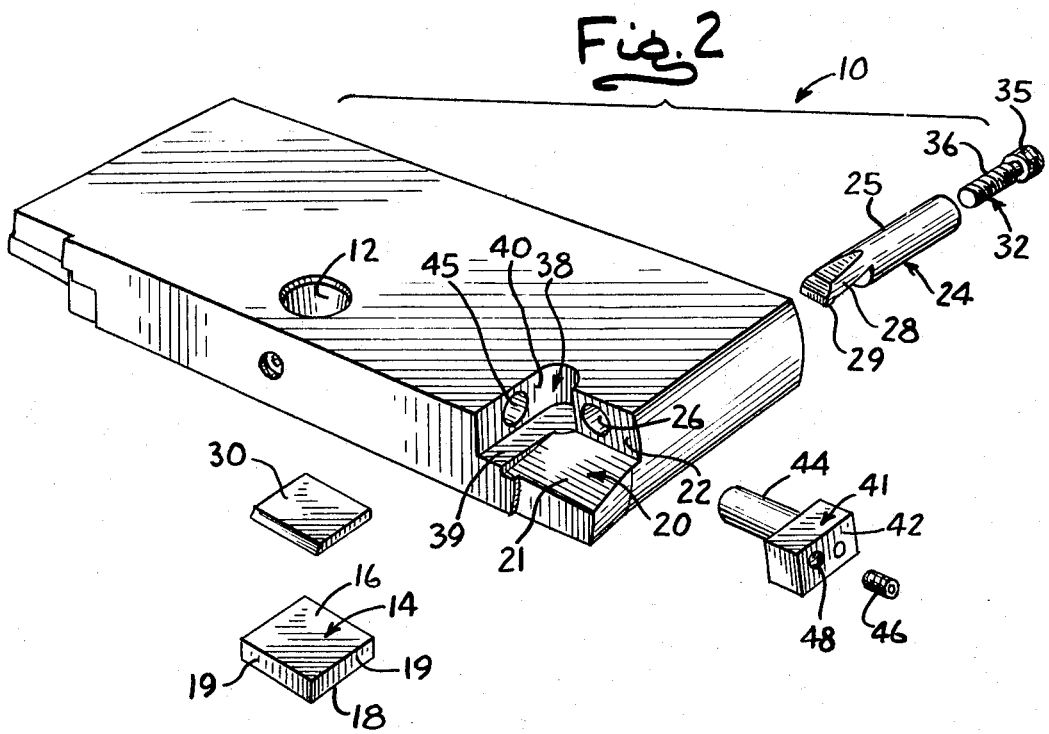

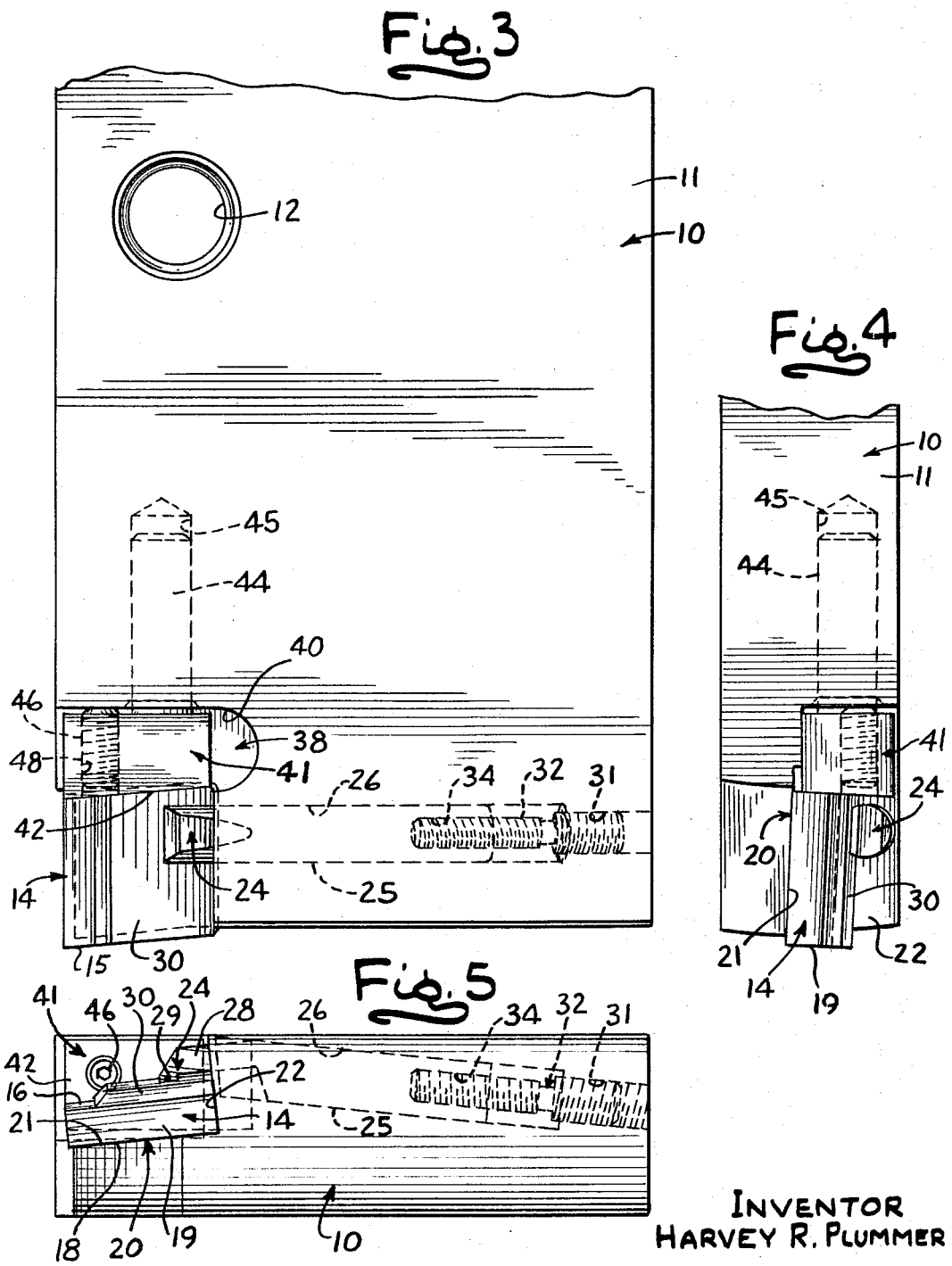

3,295,187
ADJUSTABLE BLOCK TYPE CUTTING TOOL WITH CLAMPED-ON INSERT BLADES
Harvey R. Plummer, Fond du Lac, Wis., assignor to Giddings & Lewis Machine Tool Company, Fond du Lac, Wis., a corporation of Wisconsin
Filed Mar. 1, 1965, Ser. No. 436,114
5 Claims. (Cl. 29—97)

The present invention relates in general to cutting tools and, more specifically, to a block type cutting tool with clamped-on carbide insert blades of the throw-away type. The invention represents an improvement over the cutting tool disclosed in United States Patent No. 3,060,771 issued October 30, 1962, on the application of Harold L. Johnson.

Carbide insert blades obtainable commercially are ordinarily manufactured to tolerances of ±0.001 inch in width. In a block type boring tool utilizing such blades, this can result in a variation of 0.004 inch in bore diameter for blades of the same nominal size. The accuracy of such tools may be increased by grinding the cutter blades in place in the blocks or by the use of specially selected blades. These practices are costly and time consuming, detracting from the desirability of the tool. Thus, as a practical matter heretofore, the boring size of the tool has been dependent upon the tolerances to which the block and cutter blades were manufactured.

The general aim of the present invention is to provide a block type cutting tool utilizing clamped-on insert cutter blades wherein the block with blades clamped in place may be adjusted to a desired size within any measurable tolerance.

Another object of the invention is to provide a block type cutting tool of the character set forth which has an adjustable mounting for indexable throw-away carbide insert blades and capable of giving each blade full support and proper alignment.

A further object of the invention is to provide a tool of the foregoing type with an adjustable mounting for insert type cutting blades which is free of projections beyond the surface of the tool.

Another object of the invention is to provide a block type tool for boring bars and having a pair of diametrically opposed cutters adjustable to obtain a desired bore size and to compensate for cutter wear.

Other objects and advantages will become apparent as the following description proceeds, taken together with the accompanying drawings wherein:

FIGURE 1 is a perspective view of an illustrative block type cutting tool embodying the present invention.

FIG. 2 is an exploded perspective view of the illustrative cutting tool shown in FIG. 1.

FIG. 3 is an enlarged, fragmentary plan view of the tool of FIG. 1.

FIGS. 4 and 5 are enlarged, fragmentary side and end elevational views, respectively, of the tool as shown in FIG. 3.

While the invention is susceptible of various modifications and alternative constructions, an illustrative embodiment thereof has been shown in the drawings and will be described below in detail. It should be understood, however, that there is no intention to limit the invention to the specific form disclosed, but, on the contrary, the intention is to cover all modifications, alternative constructions and equivalents falling within the spirit and scope of the invention as expressed in the appended claims.

Referring more specifically to FIGURE 1, the invention is there exemplified in an illustrative block type cutting tool 10 which in this case is adapted for use in a boring bar (not shown) driven by a machine tool spindle. The tool 10 is somewhat similar to those shown in Johnson Patent No. 3,060,771, referred to above. It comprises a holder in the form of a generally rectangular block 11 having a tapered transverse bore 12 through its medial portion perpendicular to the plane of the block and adapted to register with a tapered pin (not shown) to lock the tool in the boring bar. The block 11 carries a pair of diametrically opposed cutting blades 14 which may be throw-away inserts of tungsten carbide or the like. Each blade 14 is clamped in the block 11 and disposed so that its outer end portion presents a single cutting edge 15 for boring. The outer end of the block may be somewhat rounded to obtain suitable clearance with the bore produced by the tool.

In this instance, each blade 14 happens to be formed with an opposed pair of square or slightly rhomboid faces 16, 18 connected by relatively narrow peripheral areas 19 perpendicular to the faces 16, 18. With the blade 14 mounted in the block 11 for negative rake cutting (FIGS. 1, 4 and 5), it will be appreciated that four different cutting edges are available for presentation successively upon indexing adjustment of the blade on each face, or a total of eight cutting edges per blade.

For the purpose of receiving and holding the blades 14, the block 11 is formed with a pair of diametrically opposed corner pockets 20 situated, respectively, on opposite sides of the block. Each pocket 20 includes a downwardly and outwardly inclined supporting surface 21 for abuttingly engaging either of the flat blade faces 16, 18 so as to hold the blade 14 at suitable cutting edge angles. The pocket also includes an upstanding locating surface 22 substantially perpendicular to the surface 21 and adapted to abuttingly engage one of the narrow peripheral areas 19 of the blade to align the same in the block.

Operatively associated with each pocket 20 is a clamp 24 (FIGS. 2, 3 and 5) which engages the blade 14, tending to draw it into the pocket and to hold it tightly against the supporting and locating surfaces 21 and 22. For this purpose, the clamp 24 includes a cylindrical shank 25 having a sliding fit in a drilled hole 26 in the block 11. The hole 26 opens into the pocket 20 and is inclined with respect to the broad face of the block, while lying generally parallel to the end of the block. The clamp 24 has an inclined tip 28 carried by the cylindrical shank 25 with a flattened end portion 29 adapted to bear against chip breaker plate 30 which overlies the top face 16 of the blade 14 as the latter is held in the pocket. The tip 28 is undercut at the bottom adjacent the end portion 29 to provide a slight clearance for the chip breaker plate 30. The clearance on the underside of the tip of the clamp member and extension of the tip from the drilled hole 26 allow some slight flexing of the tip of the clamp member as it is drawn into engagement with the blade 14 and the chip breaker plate 30. During operation of the block tool for cutting purposes, however, the forces acting on the blade 14 are transmitted directly to the corner portion of the block carrying the blade and the wedging action of the clamp member 24 holds the blade in firm contact with the bottom surface 21 of the pocket. The angular disposition of the drilled hole 26 in the block 11, and the effective angle of the flat clamping face 29 of the clamp member 24 are such that the clamp acts against the chip breaker plate and insert to draw them tightly into the pocket. The axis of the drilled hole 26 lies generally parallel to the end of the block and is inclined downwardly from the face of the block at an angle greater than the inclination of the bottom surface 21 of the pocket. The end of the drilled hole 26 remote from the pocket 20 has a threaded section 31 of reduced diameter (FIGS. 3 and 5).

To move the clamp 24 in the drilled hole 26, a clamp screw 32 is threadedly engaged in a tapped hole 34 in the end of the clamp member and in the threaded section 31 of the drilled hole 26 in the block. The outer end 35 of the clamp screw has a left-hand thread as has the section 31 of the drilled hole, while the inner end 36 of the clamp screw has a right-hand thread engaged in threads in the hole 34 in the clamp member. Rotation of the screw 32, as by an Allen wrench in a socket in the head of the screw, causes the clamp 24 to be adjusted axially of the hole 26 in the block 11. The clamp 24, when drawn tightly against the chip breaker plate by rotation of the clamp screw 32, produces a downward force against the latter near its midpoint. As above noted, the angular disposition of the axis of movement of the clamp 24 downwardly and away from the bottom surface 21 of the pocket produces a wedging action by the bearing face 29 of the clamp on the chip breaker plate 30 and blade 14 to hold the latter in abutment with the bottom surface and the locating side surfaces of the blade pocket.

To release the blade 14 so that the latter may be inindexed or replaced, the clamp screw 32 is rotated in the reverse direction, overcoming the frictional force due to the wedging action which holds the clamp 24 against movement. Reverse rotation of the screw 32 overcomes the force holding the clamp 24, obtaining a positive ejection force on the clamp. If the blade 14 should not release readily when the clamp is loosened, continued turning of the clamp screw 32 moves the clamp 24 until the shoulder at the start of the undercut engages the chip breaker and blade 14 to positively eject the latter from the pocket.

Means is provided in the tool 10 for effecting precise radial adjustment of each cutter blade 14 while maintaining solid abutting contact in the pocket between the bottom one of the faces 16, 18 and two adjacent peripheral areas 19. In furtherance of this objective, a recess 38 is formed in the block 11 at the inner end of each pocket. The recess is defined by a floor 39 subsaniatlly parallel to the broad top surface of the block and by an upstanding surface 40 perpendicular to the floor 39. Mounted in recess 38 in sliding bearing engagement on the floor 39 is an adjusting wedge 41 having a top surface flush with or slightly below the top surface of the block. The wedge includes an upstanding abutting surface 42 adapted to bear against the opposed peripheral area 19 of the blade in substantially complementary relation therewith as the blade is held on the supporting surface 21 of the pocket.

In order to effect precise guidance during adjustment of the wedge 41, the latter is provided with a guide plunger 44 slidably mounted within a corresponding bore 45 in the block 11. The common axis of the plunger 44 and of the bore 45 is substantially parallel with the floor 39 of the recess and the top surface of the block 11. Adjustment of the wedge is accomplished by means of a set screw 46 which threadedly engages a tapped bore 48 in the wedge generally parallel to the plunger. The screw 46 is adapted to bear against upstanding surface 40 of the recess 38 and may be turned as by means of an Allen head wrench. To permit access for this purpose, the screw 46 is located so that its socket is above the chip breaker plate 30, as shown in FIG. 5.

It will be appreciated that, by reason of the construction, described herein, each cutter blade 14 is individually adjustable radially of the block. Such adjustments of the blades are independent of each other and independent of the clamp adjustments, permitting the tool to be precisely set for boring within particularly close tolerances. The tool can be set to a given bore size, and quickly reset to the same size even though the cutter blades be indexed or completely replaced with different blades. Such arrangement also permits regrinding of cutter blade inserts, increasing their life substantially.

I claim as my invention:

1. A block type cutting tool with insert type cutter blades comprising, in combination, a block having a pair of diametrically opposed pockets in opposite sides thereof, each said pocket having an inclined supporting surface and an upstanding locating surface, each said pocket also having a recess at its inner end, a pair of throw-away cutter blades each respectively mounted in a corresponding one of said pockets, each said cutter blade having a face in abutment with said supporting surface and an upstanding peripheral area in abutment with said upstanding locating surface, clamp means in said block adapted to hold each said cutter blade in its pocket in said block, a pair of independent adjusting wedges disposed respectively in the recesses adjacent said pockets and each adapted to abuttingly engage the peripheral area of a corresponding one of said cutter blades, a guide plunger fixed to each said adjusting wedge, and adjusting means in each said wedge adapted to bear against the wall of its associated recess to effect an adjustment of one said cutter blade radially of said block.

2. A block type cutting tool with insert type cutter blades comprising, in combination, a block having an insert receiving pocket therein, said pocket having an inclined supporting surface and an upstanding locating surface, said pocket also having a recess at its inner end, a throw-away cutter blade mounted in said pocket, said cutter blade having a face in abutment with said supporting surface and an upstanding peripheral area in abutment with said upstanding locating surface, clamp means in said block adapted to hold said cutter blade in its pocket in said block, an independent adjusting wedge disposed in the recess adjacent said pocket and adapted to bear against the peripheral area of said cutter blade, a guide plunger fixed to said adjusting wedge, and adjusting means in said wedge adapted to bear against the wall of said recess to effect an adjustment of said cutter blade radially of said block.

3. A block type cutting tool with throw-away insert cutter blades comprising, in combination, a holder block having a pair of diametrically opposed pockets in opposite faces thereof, each said pocket having an inclined supporting surface and an upstanding locating surface, each said pocket also having a recess at its inner end with a floor substantially parallel to one of said block faces and an upstanding wall substantially perpendicular thereto, a pair of throw-away cutter blades each mounted in a corresponding one of said pockets, each said cutter blade having a face in abutment with said supporting surface and an upstanding peripheral area in abutment with said upstanding locating surface of its associated pocket, individual clamp means in said block adapted to hold each said cutter blade in its pocket against said supporting surface and said upstanding locating surface, a pair of independent adjusting wedges disposed respectively in the recesses adjacent said pockets for sliding movement along the corresponding recess floor thereof, said wedges also being disposed in complementary bearing relation with other upstanding peripheral areas of respective ones of said cutter blades, a guide plunger fixed to each said adjusting wedge, means defining a bore in said block for each said guide plunger, the axis of said bore being substantially parallel to said recess floor, and an adjusting screw in each said wedge substantially parallel to said guide plunger, each said screw being adapted to bear against the wall of said recess to effect an adjustment of said cutter blade radially of said block.

4. A block type cutting tool with a throw-away insert cutter blade comprising, in combination, a holder block having a blade receiving pocket with an inclined supporting surface and an upstanding locating surface, said pocket also having a recess at its inner end, means defining a floor in said recess and an upstanding wall, a throw-away cutter blade mounted in said pocket, said cutter blade having a face in abutment with said supporting surface and an upstanding peripheral area in abutment with said upstanding locating surface, clamp means in said block adapted to hold said cutter blade in said pocket, an independent adjusting wedge disposed in the recess adjacent said pocket for sliding movement along said recess floor, said wedge being disposed in abutting engagement with another upstanding peripheral area of said cutter blade, a guide plunger fixed to said adjusting wedge, means defining a bore in said block for slidably receiving said guide plunger, and an adjusting screw in said wedge substantially parallel to said guide plunger and adapted to bear against said upstanding recess wall to effect adjustment of said cutter radially of said block.

5. A block type cutting tool with a cutter blade insert as set forth in claim 2, wherein said recess has a floor, said guide plunger is of circular cross-section and said wedge member is provided with a sliding face substantially parallel to the axis of said guide plunger, said sliding face cooperating with the recess floor to preclude said wedge member from rotating about the axis of said guide plunger.

No references cited.

WILLIAM W. DYER, JR., *Primary Examiner.*

H. HINSON, *Examiner.*